United States Patent
Pak (10) Patent No.: US 9,360,978 B2
(45) Date of Patent: Jun. 7, 2016

(54) TOUCH SCREEN DISPLAY DEVICE

(71) Applicant: SAMSUNG DISPLAY CO., LTD., Yongin, Gyeonggi-Do (KR)

(72) Inventor: Sang-Jin Pak, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/456,340

(22) Filed: Aug. 11, 2014

(65) Prior Publication Data

US 2015/0042614 A1 Feb. 12, 2015

(30) Foreign Application Priority Data

Aug. 12, 2013 (KR) .................. 10-2013-0095294

(51) Int. Cl.
*G06F 3/045* (2006.01)
*G06F 3/044* (2006.01)

(52) U.S. Cl.
CPC ..................................... *G06F 3/044* (2013.01)

(58) Field of Classification Search
CPC ........................................................ G06F 3/044
USPC ................ 345/107, 156–184; 349/12, 46; 178/18.06; 257/40; 439/50
See application file for complete search history.

(56) References Cited

U.S. PATENT DOCUMENTS

| | | | | |
|---|---|---|---|---|
| 5,854,650 A * | 12/1998 | Kobori | .................... | H01J 31/15 313/494 |
| 7,742,041 B2 * | 6/2010 | Lee | ..................... | G02F 1/13338 178/18.06 |
| 7,907,126 B2 * | 3/2011 | Yoon | .................... | G02F 1/13338 345/107 |
| 8,279,361 B2 * | 10/2012 | Chen | ................... | G02F 1/13338 349/12 |
| 8,621,406 B2 * | 12/2013 | Lei | .................. | H01L 21/823821 716/110 |
| 8,994,891 B2 * | 3/2015 | Yamazaki | ............. | H01L 27/323 349/46 |
| 2002/0011972 A1 | 1/2002 | Yamazaki et al. | | |
| 2008/0211781 A1 * | 9/2008 | Yamamoto | .............. | G06F 3/042 345/173 |
| 2008/0239175 A1 * | 10/2008 | Moon | ................. | G02F 1/13624 349/12 |
| 2009/0256816 A1 * | 10/2009 | Kim | ..................... | G09G 3/3648 345/174 |
| 2009/0284492 A1 * | 11/2009 | Chino | .................. | G06F 3/0412 345/174 |
| 2010/0117980 A1 * | 5/2010 | Lee | ..................... | G02F 1/13338 345/173 |
| 2010/0156819 A1 * | 6/2010 | Takahashi | ............. | G06F 3/0412 345/173 |
| 2011/0242044 A1 | 10/2011 | Liu | | |
| 2011/0310057 A1 * | 12/2011 | Wang | .................. | G02F 1/13338 345/174 |
| 2012/0105347 A1 * | 5/2012 | Pak | ....................... | G06F 3/0412 345/173 |
| 2013/0215057 A1 * | 8/2013 | Kawachi | ................ | G06F 3/044 345/173 |
| 2013/0257794 A1 * | 10/2013 | Lee | ......................... | G06F 3/041 345/174 |
| 2014/0009442 A1 * | 1/2014 | Kim | ..................... | G06F 3/0412 345/174 |
| 2014/0248732 A1 * | 9/2014 | Kim | ..................... | G06F 3/0412 438/50 |
| 2014/0256074 A1 * | 9/2014 | Kim | ..................... | G06F 3/0412 438/30 |
| 2015/0041778 A1 * | 2/2015 | Chang | ................. | H01L 27/3262 257/40 |

FOREIGN PATENT DOCUMENTS

| | | |
|---|---|---|
| KR | 10-2011-0069632 A | 6/2011 |
| KR | 10-2012-0045287 | 5/2012 |

* cited by examiner

*Primary Examiner* — Prabodh M Dharia
(74) *Attorney, Agent, or Firm* — Lee & Morse, P.C.

(57) ABSTRACT

A touch screen display device includes a plurality of pixels and a plurality of touch sensing units. Each touch sensing unit includes a sensing transistor, a first touch electrode between a gate electrode and a semiconductor layer of the sensing transistor, a second touch electrode spaced from the first touch electrode, and a coupling portion to couple the first and second touch electrodes.

17 Claims, 5 Drawing Sheets

TOUCH SCREEN DISPLAY DEVICE

CROSS-REFERENCE TO RELATED APPLICATION

Korean Patent Application No. 10-2013-0095294, filed on Aug. 12, 2013, in the Korean Intellectual Property Office, and entitled, "Touch Screen Display Device," is incorporated by reference in its entirety.

BACKGROUND

1. Field

One or more embodiments described herein relate to a touch screen.

2. Description of the Related Art

A touch screen receives commands based on contact with a user's hand or an object. Touch screens may take the place of a separate input device such as a keyboard or mouse. Therefore, their use has increased over the years, especially in portable devices.

SUMMARY

In accordance with one embodiment, a touch screen display device includes a plurality of pixels; and a plurality of touch sensing units, each touch sensing unit including: a sensing transistor; a first touch electrode between a gate electrode and a semiconductor layer of the sensing transistor; a second touch electrode spaced from the first touch electrode; and a coupling portion to couple the first and second touch electrodes.

The touch screen display device may include a first electrode of the sensing transistor is coupled to a driving line, and a second electrode of the sensing transistor is coupled to a sensing line. The sensing transistor may be coupled to the driving line is maintained in an on-state during a period in which a touch driving signal is supplied to the driving line. The gate electrode of the sensing transistor may be coupled to a control line through which a transistor-on signal and a transistor-off signal are supplied.

The second touch electrode may be coupled to an initialization voltage line. An initialization switch may provide an initialization voltage to the initialization voltage line. Two gate insulating layers may be between the gate electrode and the semiconductor layer of the sensing transistor. The first touch electrode may be between the two gate insulating layers.

The touch screen display device may include a plurality of driving lines coupled to respective touch sensing units on each row; a plurality of control lines coupled to respective touch sensing units on each row; and a plurality of sensing lines coupled to respective touch sensing units on each column. The driving lines may be coupled to the first electrode of respective sensing transistors of the touch sensing units, the control lines may be coupled to the gate electrode of respective sensing transistors of the touch sensing units, and the sensing lines may be coupled to the second electrode of respective sensing transistors of the touch sensing units.

The touch screen display device may include a touch driving unit configured to progressively supply a touch driving signal to the driving lines; and a touch detecting unit configured to detect a touch position based on a sensing signal output to the sensing lines. The touch driving signal may be supplied to a specific driving line commonly coupled to touch sensing units on one row during a period, and the transistor-on signal mat be supplied to a control line commonly coupled to the touch sensing units on the one row.

The touch screen display device may include a plurality of initialization voltage lines coupled to respective touch sensing units on each row. The initialization voltage lines may be coupled to respective second touch electrodes in the touch sensing units. The touch screen display device may also include a plurality of initialization switches, each initialization switch having one end coupled to respective initialization voltage lines and another end to receive the initialization voltage.

The touch screen display device may include a plurality of scan lines and a plurality of data lines coupled to the plurality of pixels; a scan driver configured to supply a scan signal to the scan lines; and a data driver configured to supply data signals to the data lines. Each pixel may include an organic light emitting diode.

In accordance with another embodiment, an apparatus includes a touch sensor; and a pixel adjacent the touch sensor, wherein the touch sensor includes a first transistor and the pixel includes a second transistor, and wherein gates of the first and second transistors are substantially coplanar on a first layer and sources and drains of the first and second transistors are substantially coplanar on a second layer. The touch sensor may include an electrode in a layer that extends between the gate of the first transistor and the source and drains of the first transistor and that may extend between the gate of the second transistor and the source and drains of the second transistor. The pixel may include an organic light emitting electrode, and the electrode may extend to be substantially coplanar with an electrode of an organic light emitting diode.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

Figure 1:
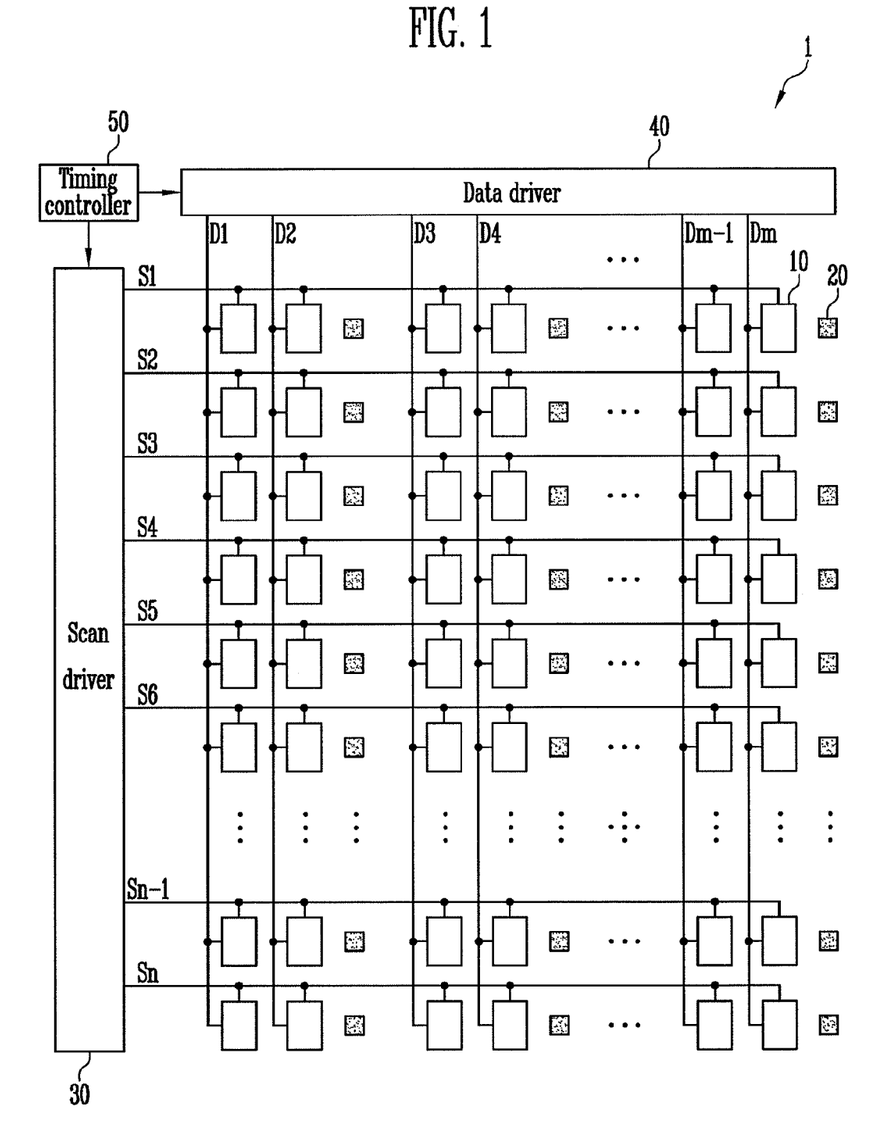
FIG. 1 illustrates an embodiment of a touch screen display device.

FIG. 1 illustrates an embodiment of a touch screen display device 1 which includes a plurality of pixels 10 and a plurality of touch sensing units 20. The pixels 10 and touch sensing units (e.g., touch sensors) 20 may be arranged as in FIG. 1, or may have a different arrangement in other embodiments.

The pixels 10 display a predetermined image through light emission. The pixels 10 may be coupled to a scan lines S1 to Sn and of data lines D1 to Dm. Each pixel 10 may receive first and second power sources ELVDD and ELVSS supplied from a power supply unit. In this case, each pixel 10 may generate light corresponding to a data signal based on current flowing from the first power source ELVDD to the second power source ELVSS, via an organic light emitting diode.

The touch screen display device 1 may also include a scan driver 30, a data driver 40, and a timing controller 50 in order to control the pixels 10. The scan driver 30 generates a scan signal under control of timing controller 50, and supplies the scan signal to scan lines S1 to Sn. The data driver 40 generates data signals under control of the timing controller 50, and supplies the data signals to corresponding data lines D1 to Dm. If the scan signal is progressively supplied to scan lines S1 to Sn, pixels are progressively selected for each line. The selected pixels may receive data signals supplied from data lines D1 to Dm. The timing controller 50 may supply one or more predetermined control signals to the scan driver 30 and data driver 40.

Figure 2:
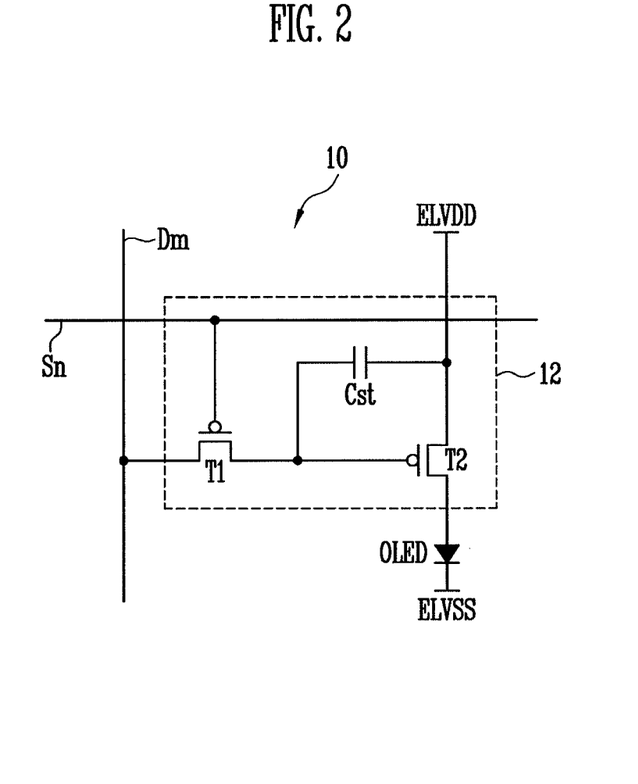
FIG. 2 illustrates a pixel.

FIG. 2 illustrates an embodiment of a pixel, which, for example, may be any of pixels 10 in FIG. 1. For the sake of illustration, a pixel coupled to an n-th scan line Sn and an m-th data line Dm is shown in FIG. 2.

Referring to FIG. 2, pixel 10 includes an organic light emitting diode (OLED) and a pixel circuit 12 coupled to data line Dm and scan line Sn to control the OLED. An anode electrode of the OLED may be coupled to pixel circuit 12, and a cathode electrode of the OLED may be coupled to the second power source ELVSS. The OLED generates light with a luminance based on an amount of current from pixel circuit 12.

The pixel circuit 12 controls the amount of current supplied to the OLED based on data signal from data line Dm, when a scan signal is supplied to scan line Sn. The pixel circuit 12 may include a first transistor T1 and a second transistor T2. The second transistor T2 is coupled between the first power source ELVDD and the OLED. The first transistor T1 is coupled to the second transistor T2, data line Dm, and scan line Sn. The pixel circuit also includes a storage capacitor Cst coupled between a gate electrode and a first electrode of the second transistor T2.

A gate electrode of the first transistor T1 is coupled to scan line Sn. A first electrode of the first transistor T1 is coupled to the data line Dm. A second electrode of the first transistor T1 is coupled to one terminal of the storage capacitor Cst. The first electrode of the first transistor T1 may be a source or drain electrode, and the second electrode of the first transistor T1 may be the other of the source or drain electrode.

The first transistor T1 is turned on when the scan signal is supplied from the scan line Sn. When the first transistor T1 turns on, the data signal from data line Dm is supplied to the storage capacitor Cst. The storage capacitor Cst may stores (charges) a voltage corresponding to the data signal.

The gate electrode of the second transistor T2 is coupled to the one terminal of the storage capacitor Cst. A first electrode of the second transistor T2 is coupled to the other terminal of the storage capacitor Cst and power source ELVDD. A second electrode of second transistor T2 may be coupled to the anode electrode of the OLED.

The second transistor T2 controls the amount of current flowing from the first power source ELVDD to the second power source ELVSS, via the OLED, based on the voltage stored in storage capacitor Cst. The OLED generates light corresponding to the amount of the current supplied from the second transistor T2.

The structure of the pixel in FIG. 2 is merely illustrative of pixels 10 that may be include in the touch screen display device. The pixel may have a different structure (e.g., with a different number of transistors and/or capacitors) in other embodiments.

Figure 3:
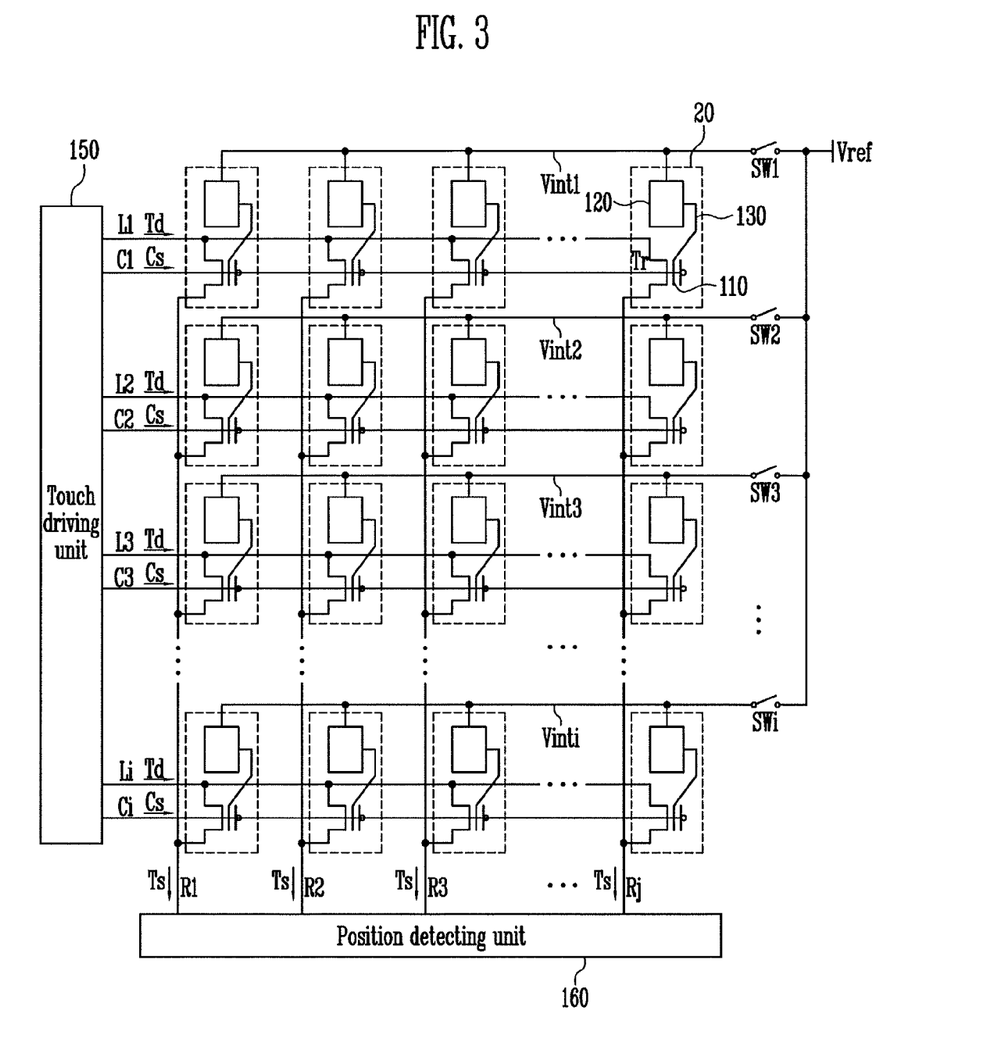
FIG. 3 illustrates an embodiment of a touch sensing unit.
Figure 4:
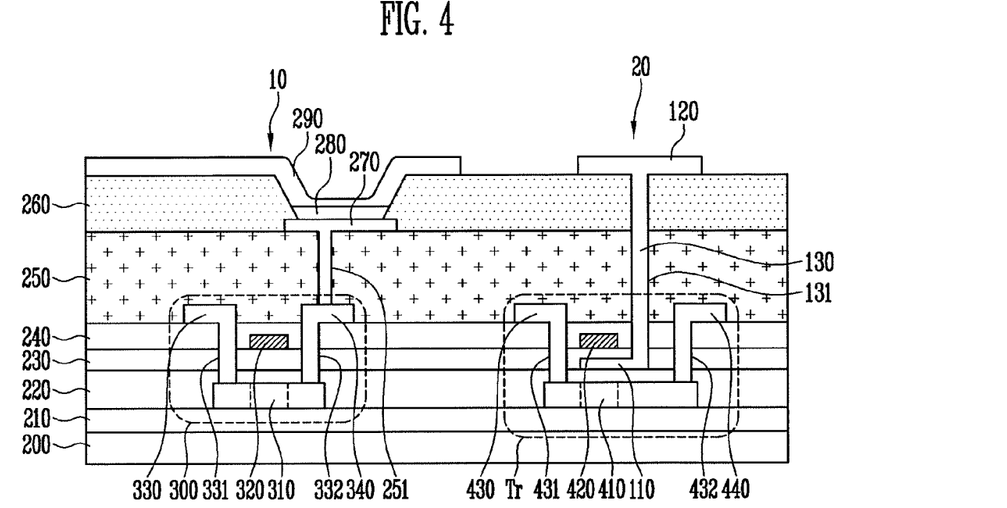
FIG. 4 illustrates a section of a touch screen display device.

FIG. 3 illustrates an embodiment of touch sensing unit 20, and FIG. 4 illustrates a section of the touch screen display device. Cross-sections of pixel 10 and touch sensing unit 20 will be mainly illustrated in FIG. 4.

Referring to FIGS. 3 and 4, touch sensing unit 20 includes a sensing transistor Tr, a first touch electrode 110, a second touch electrode 120 and a coupling portion 130. The sensing transistor Tr may receive a touch driving signal Td through a first electrode 430. The sensing transistor Tr may output a sensing signal Ts through a second electrode 440. The on-off state of sensing transistor Tr may be controlled by a control signal Cs supplied to a gate electrode 420. While electrodes 110 and 120 are indicated to be different electrodes, they may also be considered as one electrode that includes coupling portion 130.

The control signal Cs supplied to sensing transistor Tr may include a transistor-on signal Ton to turn on sensing transistor Tr, and a transistor-off signal Toff to turn off sensing transistor Tr. The first electrode 430 of the sensing transistor Tr may be coupled to driving lines L1 to Li. The second electrode 440 of the sensing transistor Tr may be coupled to sensing lines R1 to Rj.

The gate electrode 420 of each of the sensing transistors Tr may be coupled to respective control lines C1 to Ci. The first touch electrode 110 may be positioned between the gate electrode 420 and a semiconductor layer 410 of the sensing transistor Tr. The second touch electrode 120 may be spaced from first touch electrode 110. For example, second touch electrode 120 may be positioned in a layer different from that of the first touch electrode 110. That is, at least one layer may exist between the first and second touch electrodes 110 and 120.

The coupling portion 130 may allow the first and second touch electrodes 110 and 120 to be electrically coupled to each other. For example, a contact hole 131 may be formed in the at least one layer between the first and second touch electrodes 110 and 120. The coupling portion 130 may allow the first and second touch electrodes 110 and 120 to be coupled to each other through the contact hole 131.

In order to place the first touch electrode 110 between the gate electrode 420 and the semiconductor layer 410 of the sensing transistor Tr, the gate electrode 420 and semiconductor layer 410 of the sensing transistor Tr may be insulated from each other, for example, using two gate insulating layers 220 and 230. For example, as shown in FIG. 4, first and second gate insulating layers 220 and 230 may be positioned between the gate electrode 420 and semiconductor layer 410 of the sensing transistor Tr.

The first touch electrode 110 is between the first and second gate insulating layers 220 and 230, so that the first touch electrode 110 can be positioned between the gate electrode 420 and the semiconductor layer 410 of the sensing transistor Tr.

A sensing transistor Tr having a gate electrode 420 above semiconductor layer 410 is illustrated in FIG. 4. In this embodiment, it is sufficient for the first touch electrode 110 to be between the gate electrode 420 and semiconductor layer 410 of the sensing transistor Tr. Therefore, a sensing transistor Tr having a gate electrode 420 below semiconductor layer 410 may be used.

In order to improve the accuracy of touch sensing, initialization of the touch electrodes 110 and 120 may be performed. For example, the second touch electrode 120 may be coupled to initialization voltage lines Vint1 to Vinti, through which an initialization voltage Vref is applied.

The initialization voltage lines Vint1 to Vinti may receive the initialization voltage Vref through respective initialization switches SW1 to SWi. One end of each initialization switch SW1 to SWi may be coupled to a respective one of initialization voltage lines Vint1 to Vinti1. Another end of each initialization switch SW1 to SWi may be coupled to an initialization voltage source, which supplies initialization voltage Vref.

Thus, when initialization switches SW1 to SWi turn on, initialization voltage Vref can be applied to the second touch electrodes 120 through the initialization voltage lines Vint1 to Vinti. The initialization voltage Vref may be a specific or predetermined level voltage or a ground voltage.

The touch screen display device 1 include a plurality of driving lines L1 to Li, a plurality of sensing lines R1 to Rj, and a plurality of control lines C1 to Ci. The touch screen display device 1 also includes a touch driving unit 150 and a position detecting unit 160. Each of the edriving lines L1 to Li may be coupled to touch sensing unit 20 on each row. For example, an i-th driving line Li may be commonly coupled to a plurality of touch sensing units 20 constituting an i-th row.

In this case, each of the driving lines L1 to Li may be coupled to the first electrode of the sensing transistor Tr included in a corresponding touch sensing unit 20. Each driving line L1 to Li may supply touch driving signal Td to a corresponding touch sensing unit 20.

Like driving lines L1 to Li, each of the control lines C1 to Ci may be coupled to touch sensing units 20 on each row. For example, an i-th control line Ci may be commonly coupled to a plurality of touch sensing unit 20 constituting an i-th row. In this case, each control line C1 to Ci may be coupled to the gate electrode of the sensing transistor Tr included in a corresponding touch sensing unit 20. Each control line C1 to Ci may supply control signal Cs to a corresponding touch sensing unit 20.

Each of the sensing lines R1 to Rj may be coupled to touch sensing units 20 on each column. For example, a j-th sensing line Rj may be commonly coupled to a plurality of touch sensing units 20 constituting a j-th column. In this case, each sensing line R1 to Rj may be coupled to the second electrode of the sensing transistor Tr included in a corresponding touch sensing unit 20. Each sensing lines R1 to Rj may supply, to position detecting unit 160, sensing signal Ts from the corresponding touch sensing unit 20.

The touch driving unit 150 may supply touch driving signal Td to driving lines L1 to Li. For example, touch driving unit 150 may progressively supply touch driving signal Td to driving lines L1 to Li. The touch driving unit 150 may also supply the control signal Cs to the control lines C1 to Ci.

The position detecting unit 160 may detect a touch position, using the sensing signal Ts supplied from touch sensing units 20 through sensing lines R1 to Rj. When a user's touch exists on a specific touch sensing unit 20, the capacitance between the semiconductor layer 410 and gate electrode 420 of sensing transistor Tr is decreased by the first touch electrode 110, the second touch electrode 120, and coupling portion 130.

Therefore, the current or voltage of the sensing signal Ts output from the touched touch sensing unit 20 may be decreased. The position detecting unit 160 senses a variation in the sensing signal Ts from the touch sensing unit 20, to thereby determine a user's touch position.

The touch screen display unit 1 may further include a plurality of initialization voltage lines Vint1 to Vinti and a plurality of initialization switches SW1 to SWi, which may be configured to initialize the touch sensing units 20. Each of the initialization voltage lines Vint1 to Vinti may be coupled to touch sensing units on each row. For example, an i-th initialization voltage line Vinti may be commonly coupled to a plurality of touch sensing units 20 constituting an i-th row. Each initialization voltage line Vint1 to Vinti may be coupled to the second touch electrode 120 in a corresponding touch sensing unit 20. Each initialization voltage line Vint1 to Vinti may supply the initialization voltage Vref to the corresponding touch sensing unit 20.

The initialization switches SW1 to SWi may be respectively coupled between the initialization voltage lines Vint1 to Vinti and the initialization voltage Vref. For example, one end of each of the initialization switches SW1 to SWi may be coupled to a respective one the initialization voltage lines Vint1 to Vinti. Another end of each of the initialization switches SW1 to SWi may receive the initialization voltage Vref. The on-off state of the initialization switches SW1 to SWi may be controlled by the touch driving unit 150.

Referring to FIG. 4, pixel 10 and touch sensing unit 20 may be formed on a substrate 200. Substrate 200 may be made of a material having, for example, an insulation property such as glass, plastic, silicon, or synthetic resin. The substrate 200 may be implemented with a film having flexibility to allow for bending or folding.

A buffer layer 210 may be formed on substrate 200. The buffer layer 210 may prevent diffusion of impurities in substrate 200. The buffer layer 210 may be formed of an insulation material such as silicon oxide (SiOx) or silicon nitride (SiNx).

The pixel 10 may be configured with a pixel circuit 12 including a plurality of transistors and an OLED. A plurality of pixels 10 may be arranged on substrate 200.

For illustrative purposes, only a transistor 300 directly corresponding to the OLED has been illustrated in FIG. 4. Other transistors in pixel circuit 12 may have the same or a similar structure as transistor 300.

The transistor 300 in pixel 10 may be configured with a semiconductor layer 310, a gate electrode 320, a first electrode 330, and a second electrode 340. The first electrode 330 and second electrode 340 may be source and drain electrodes. For example, if first electrode 330 is a source electrode, the second electrode 340 is a drain electrode. The semiconductor layer 310 may be on buffer layer 210. In a case where buffer layer 210 is omitted, semiconductor layer 310 may be on substrate 200.

Two gate insulating layers 220 and 230 may be positioned on the semiconductor layer 310. For example, first and second gate insulating layers 220 and 230 may be positioned between the semiconductor layer 310 and the gate electrode 320. The gate insulating layers 220 and 230 may be made of an insulation material such as silicon oxide or silicon nitride. The gate electrode 320 may be formed in a predetermined pattern on the second gate insulating layer 230.

An interlayer insulating layer 240 may be formed on gate electrode 320. Like gate insulating layers 220 and 230, the interlayer insulating layer 240 may be formed of a predetermined insulation material. Thus, gate insulating layers 220 and 230 may provide insulation between the semiconductor layer 310 and gate electrode 320. The interlayer insulating layer 240 may provide insulation between the gate electrode 320 and the first and second electrodes 330 and 340.

The first and second electrodes 330 and 340 may be formed on interlayer insulating layer 240. The first and second electrodes 330 and 340 may be electrically coupled to respective sides of semiconductor layer 310, through contact holes 331 and 332 formed in gate insulating layers 220 and 230 and interlayer insulating layer 240.

The gate electrode 320, first electrode 330, and second electrode 340 may be formed of a metal such as molybdenum (Mo), tungsten (W), titanium (Ti) or aluminum (Al), or an alloy or stacked structure thereof. These electrodes may be formed from different materials in other embodiments.

A planarization layer 250 is formed on the interlayer insulating layer 240 and the first and second electrodes 330 and 340. The planarization layer 250 may be formed of an insulation material such as nitride or oxide. A via hole 251 may be formed in planarization layer 250, to expose a predetermined portion of the second electrode 340. An anode electrode 270 may be coupled to the second electrode 340 through via hole 251 and may be formed on the planarization layer 250.

The OLED may include anode electrode 270, an emission layer 280, and cathode electrode 290. A pixel defining layer 260 may be formed on the planarization layer 250, to expose at least one portion of the anode electrode 270. The pixel defining layer 260 may be made of an acryl-based organic compound or an organic insulation material such as polyamide or polyimide, or another material. Thus, the pixel defining layer 260 may be formed of various types of insulation materials.

The anode electrode 270 may be formed of various conductive materials. The emission layer 280 may be formed on anode electrode 270 and may be exposed to the outside through the pixel defining layer 260.

The emission layer 280 may include an organic emission layer for self-luminescence. The emission layer 280 may have a structure in which a hole transporting layer, an organic emission layer, and an electron transporting layer are laminated. The emission layer 280 may include a hole injection layer and an electron injection layer.

The cathode electrode 290 may be formed on emission layer 280. Holes injected from the anode electrode 270 and electrons injected from the cathode electrode 290 are combined in the organic emission layer, to thereby form excitons. Light of a specific wavelength is generated in each emission layer 280 based on energy from the excitons.

As previously described, touch sensing unit 20 may include a sensing transistor Tr, a first touch electrode 110, a second touch electrode 120, and a coupling portion 130. A plurality of touch sensing units 20 may be arranged on the substrate 200.

The sensing transistor Tr may have the same form as transistor 300 in pixel 10. The sensing transistor Tr may be configured with a semiconductor layer 410, a gate electrode 420, a first electrode 430, and a second electrode 430. The first electrode 430 and second electrode 440 may be source and drain electrodes. For example, if the first electrode 430 is a source electrode, the second electrode 440 is a drain electrode.

The semiconductor layer 410 may be positioned on buffer layer 210. When buffer layer 210 is omitted, semiconductor layer 410 may be on substrate 200. The two gate insulating layers 220 and 230 may be positioned on the semiconductor layer 410. For example, the first and second gate insulating layers 220 and 230 may be positioned between the semiconductor layer 410 and the gate electrode 420. In this case, first touch electrode 110 may be between the first and second insulating layers 220 and 230.

The gate electrode 420 may be formed in a predetermined pattern on the second gate insulating layer 230. The interlayer insulating layer 240 may be formed on the gate electrode 420. First and second electrodes 430 and 440 may be formed on the interlayer insulating layer 240. First and second electrodes 430 and 440 may be electrically coupled to respective sides of semiconductor layer 410 through contact holes 431 and 432 in gate insulating layers 220 and 230 and interlayer insulating layer 240.

The planarization layer 250 and pixel defining layer 260 may be sequentially formed on interlayer insulating layer 240 and first and second electrodes 430 and 440. In this case, the second touch electrode 120 may be positioned on the pixel defining layer 260. A contact hole 131 may be formed in the second gate insulating layer 230, interlayer insulating layer 240, planarization layer 250, and pixel defining layer 260, which are between first and second touch electrodes 110 and 120. The coupling portion 130 may allow the first and second touch electrodes 110 and 120 to be coupled to each other through contact hole 131.

In another embodiment, the second touch electrode 120 may be positioned on the planarization layer 250. In this case, the contact hole 131 passes through the second gate insulating layer 230, interlayer insulating layer 240, and planarization layer 250. The coupling portion 130 may allow the first and second touch electrodes 110 and 120 to be coupled to each other through the contact hole 131.

Figure 5:
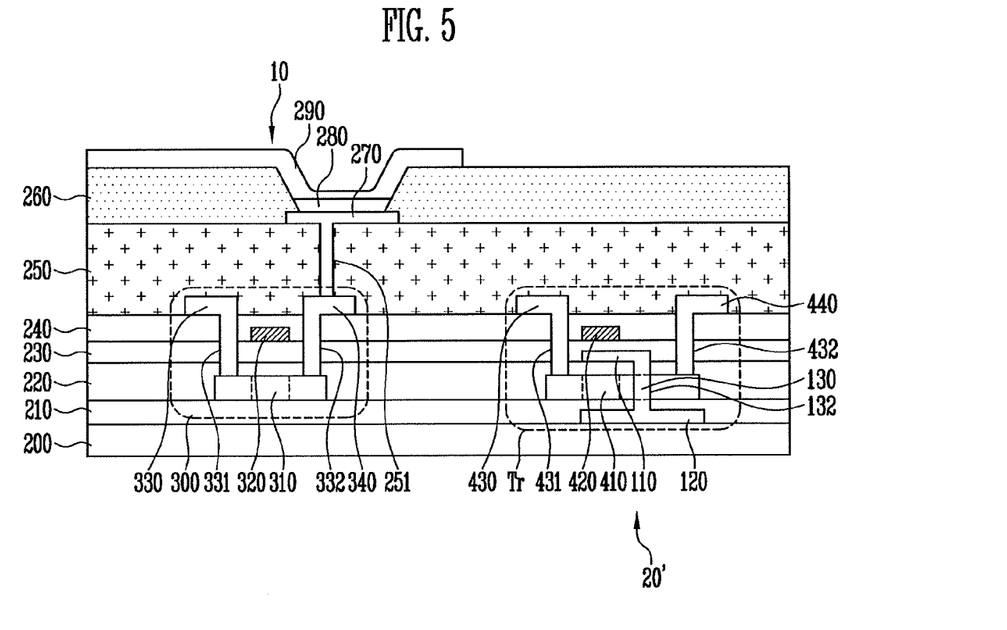
FIG. 5 illustrates another embodiment of the touch sensing unit.

FIG. 5 illustrates another embodiment of the touch sensing unit 20'. Referring to FIG. 5, the second touch electrode 120 in the touch sensing unit 20' may be positioned between the buffer layer 210 and substrate 200. Therefore, coupling portion 130 may allow first and second touch electrodes 110 and 120 to be coupled to each other through a contact hole 132 in buffer layer 210 and first gate insulating layer 220. The touch sensing unit 20 in FIG. 4 can sense a touch from a front side of the touch screen display device 1. The touch sensing unit 20' in FIG. 5 can sense a touch from a rear side of the touch screen display device 1.

Figure 6:
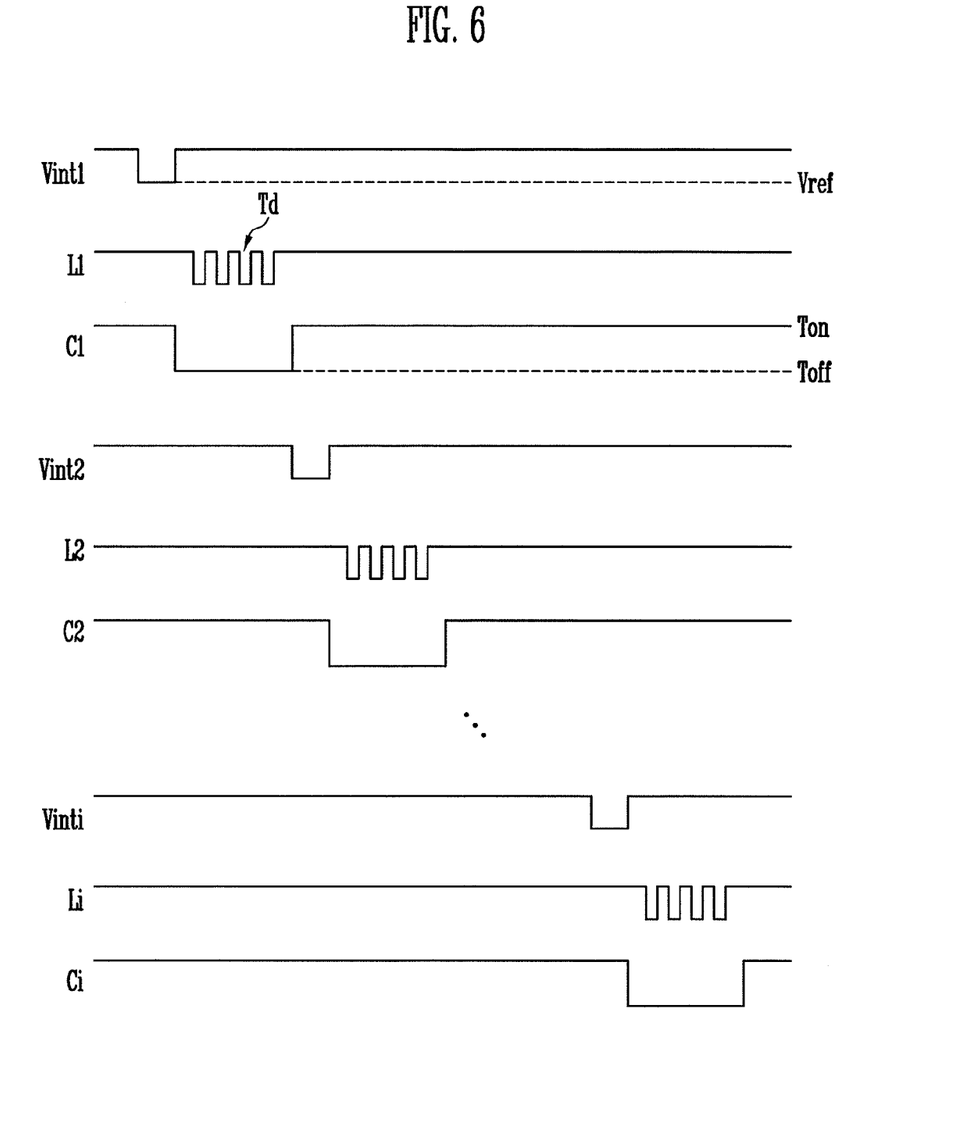
FIG. 6 illustrates an embodiment of a method for driving a touch screen.

FIG. 6 illustrates a waveform which may be used in an embodiment of a method for driving a touch screen display device. Referring to FIG. 6, in the touch screen display device, touch driving signal Td may be progressively supplied to driving lines L1 to Li. For example, touch driving signal Td may be progressively supplied from first driving line L1 to i-th driving line Li. In this case, touch driving signals Td supplied to the driving lines may or may not overlap one another.

Touch sensing units 20 are grouped for each row, so that the grouped touch sensing units 20 can receive the touch driving signal Td. In order to initialize the touch sensing unit 20, initialization voltage Vref may be supplied to touch sensing unit 20 before the touch driving signal Td is supplied. Therefore, as in FIG. 6, initialization voltage Vref may be supplied to touch sensing unit 20 before the touch driving signal Td is supplied.

For example, initialization voltage Vref may be applied to the i-th initialization voltage line Vinti before touch driving signal Td is supplied to the i-th driving line Li. The i-th initialization switch SWi may maintain a turn-on state during a predetermined period before the touch driving signal Td is supplied to the i-th driving line Li.

The transistor-on signal Ton may be supplied with touch driving signal Td, supplied to the touch sensing unit 20 receiving the touch driving signal Td, so that each touch sensing unit 20 can output, to sensing lines R1 to Rj, the touch driving signal Td and/or the sensing signal Ts which reflects a user's touch. That is, the transistor-on signal Ton may be supplied to a specific control line commonly coupled to touch sensing units 20 on one row, during the period in which the touch driving signal Td is supplied to a specific driving line commonly coupled to the touch sensing units 20 on the one row. For example, transistor-on signal Ton may be supplied to the i-th control line Ci during the period in which touch driving signal Td is supplied to i-th driving line Li. Accordingly, sensing transistor Tr of the touch sensing unit 20 can maintain a turn-on state during the period in which the touch driving signal Td is supplied.

After the touch driving signal Td is supplied, the transistor-off signal Toff may be supplied to a corresponding touch sensing unit 20. Accordingly, sensing transistor Tr of the corresponding touch sensing unit 20 can assume a turn-off state.

By way of summation and review, one or more of the aforementioned embodiments provide a touch screen display device having a new structure, in which a display device and a touch sensor are integrated with each other.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A touch screen display device, comprising:
a plurality of pixels; and
a plurality of touch sensing units, each touch sensing unit including a sensing transistor; a first touch electrode between a gate electrode and a semiconductor layer of the sensing transistor; a second touch electrode spaced from the first touch electrode; and a coupling portion to couple the first and second touch electrodes, wherein:
each of the pixels includes an organic light emitting diode,
the first touch electrode is in a layer that extends between the gate electrode of the sensing transistor and the semiconductor layer of the sensing transistor and that extends between a gate electrode of a transistor in at least one of the pixels and a semiconductor layer of the transistor in at least one of the pixels, and
the second touch electrode is substantially coplanar with an electrode of the organic light emitting diode in at least one of the pixels.

2. The device as claimed in claim 1, wherein:
a first electrode of the sensing transistor is coupled to a driving line, and
a second electrode of the sensing transistor is coupled to a sensing line.

3. The device as claimed in claim 2, wherein the sensing transistor coupled to the driving line is maintained in an on-state during a period in which a touch driving signal is supplied to the driving line.

4. The device as claimed in claim 2, wherein the gate electrode of the sensing transistor is coupled to a control line through which a transistor-on signal and a transistor-off signal are supplied.

5. The device as claimed in claim 1, wherein the second touch electrode is coupled to an initialization voltage line.

6. The device as claimed in claim 5, further comprising:
an initialization switch to provide an initialization voltage to the initialization voltage line.

7. The device as claimed in claim 1, wherein two gate insulating layers are between the gate electrode and the semiconductor layer of the sensing transistor.

8. The device as claimed in claim 7, wherein the first touch electrode is between the two gate insulating layers.

9. The device as claimed in claim 1, further comprising:
a plurality of driving lines coupled to respective touch sensing units on each row;
a plurality of control lines coupled to respective touch sensing units on each row; and
a plurality of sensing lines coupled to respective touch sensing units on each column.

10. The device as claimed in claim 9, wherein:
the driving lines are coupled to the first electrode of respective sensing transistors of the touch sensing units,
the control lines are coupled to the gate electrode of respective sensing transistors of the touch sensing units, and
the sensing lines are coupled to the second electrode of respective sensing transistors of the touch sensing units.

11. The device as claimed in claim 10, further comprising:
a touch driver to progressively supply a touch driving signal to the driving lines; and
a touch detector to detect a touch position based on a sensing signal output to the sensing lines.

12. The device as claimed in claim 11, wherein:
the touch driving signal is supplied to a specific driving line commonly coupled to touch sensing units on one row during a period, and
the transistor-on signal is supplied to a control line commonly coupled to the touch sensing units on the one row.

13. The device as claimed in claim 10, further comprising:
a plurality of initialization voltage lines coupled to respective touch sensing units on each row.

14. The device as claimed in claim 13, wherein the initialization voltage lines are coupled to respective second touch electrodes in the touch sensing units.

15. The device as claimed in claim 14, further comprising:
a plurality of initialization switches
wherein each initialization switch has one end coupled to respective initialization voltage lines and another end to receive the initialization voltage.

16. The device as claimed in claim 1, further comprising:
a plurality of scan lines and a plurality of data lines coupled to the plurality of pixels;
a scan driver to supply a scan signal to the scan lines; and
a data driver to supply data signals to the data lines.

17. An apparatus, comprising:
a touch sensor; and
a pixel adjacent the touch sensor,
wherein the touch sensor includes a first transistor and the pixel includes a second transistor, wherein gates of the first and second transistors are substantially coplanar on a first layer and sources and drains of the first and second transistors are substantially coplanar on a second layer, and wherein:
the pixel includes an organic light emitting diode,
the touch sensor includes a first electrode and a second electrode,
the first electrode is in a layer that extends between the gate of the first transistor and the source and drains of the first transistor and that extends between the gate of the second transistor and the source and drains of the second transistor, and
the second electrode is connected to the first electrode and is substantially coplanar with an electrode of the organic light emitting diode.

* * * * *